April 10, 1956 W. J. JAKIMIUK 2,741,446
AIRCRAFT LANDING SKIS
Filed March 9, 1953 5 Sheets-Sheet 1
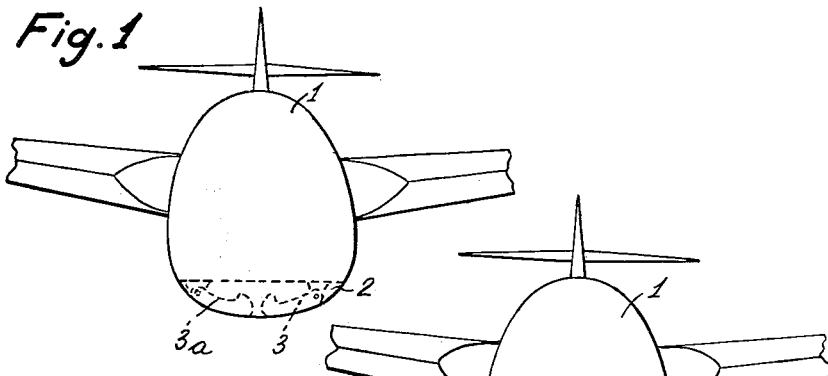
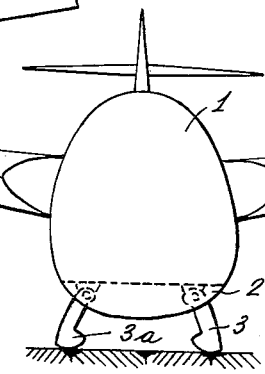
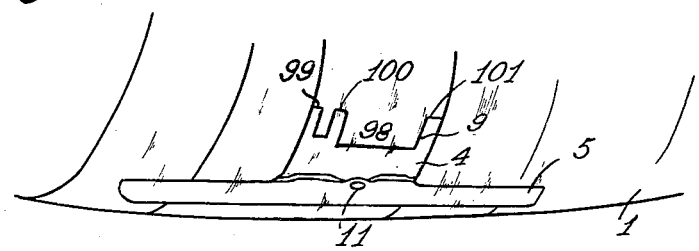
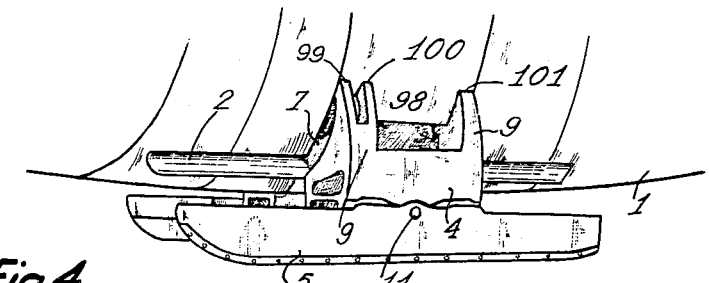

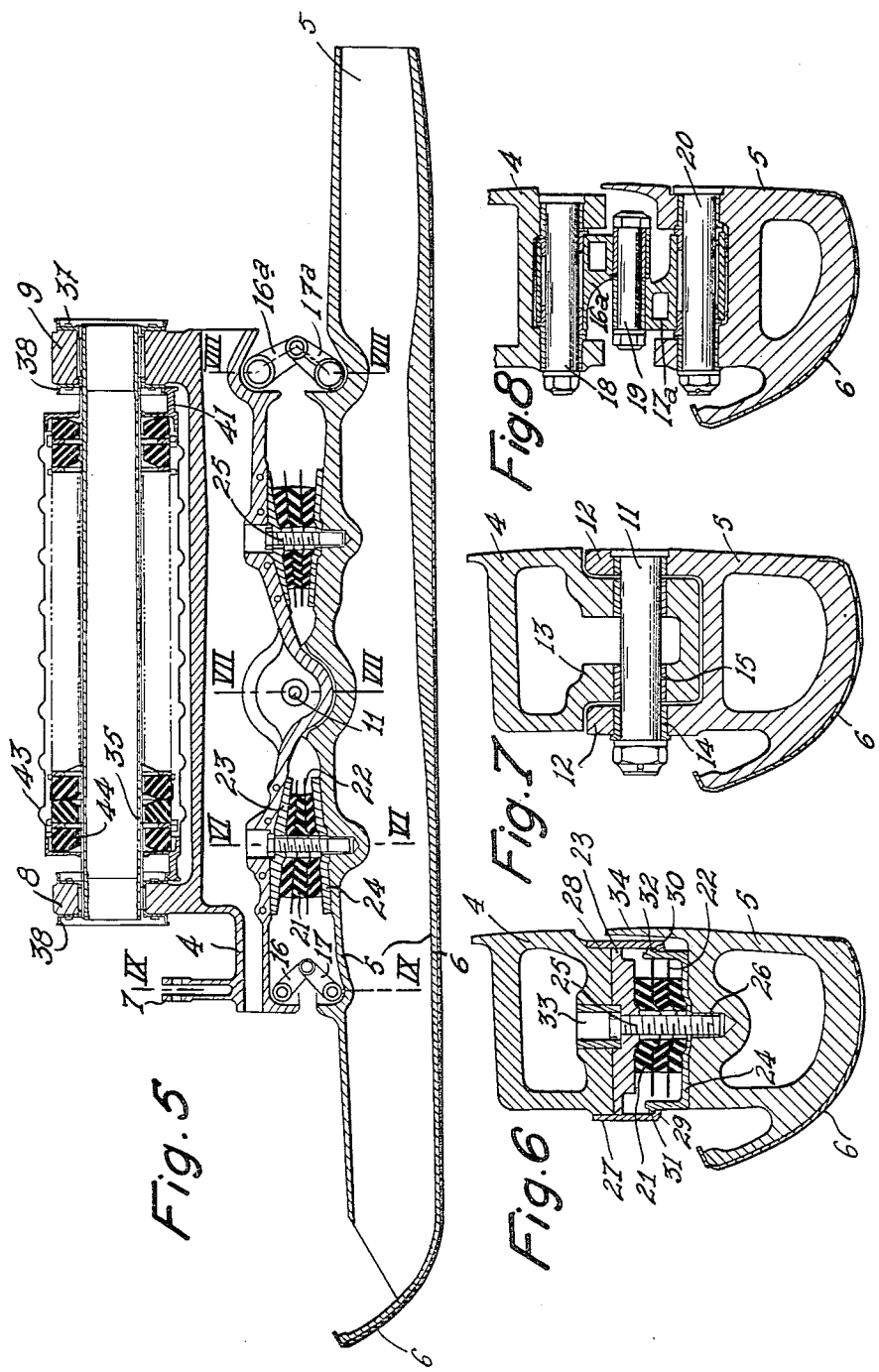

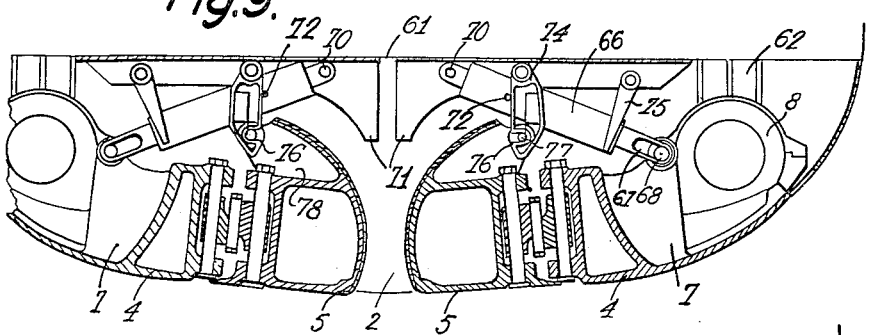
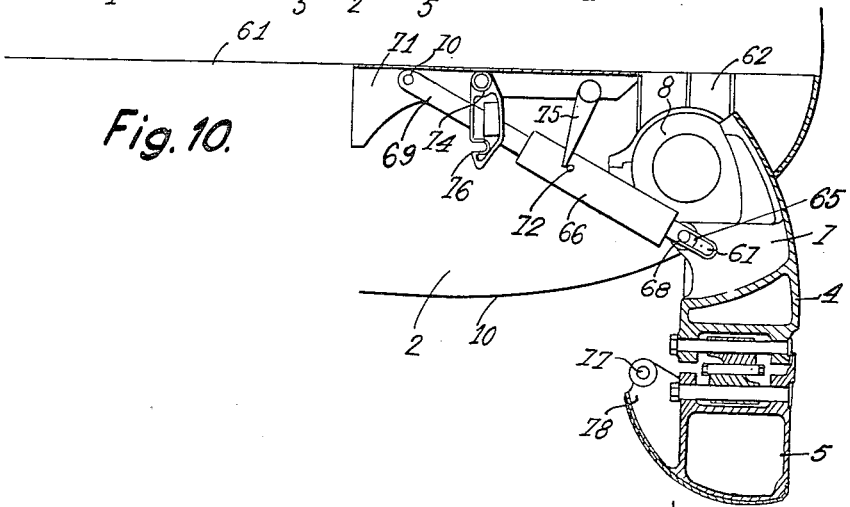
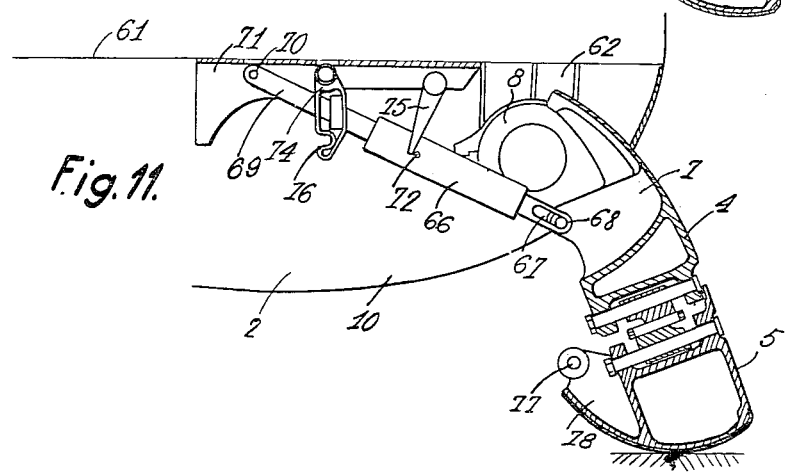

April 10, 1956  W. J. JAKIMIUK  2,741,446
AIRCRAFT LANDING SKIS
Filed March 9, 1953  5 Sheets-Sheet 4

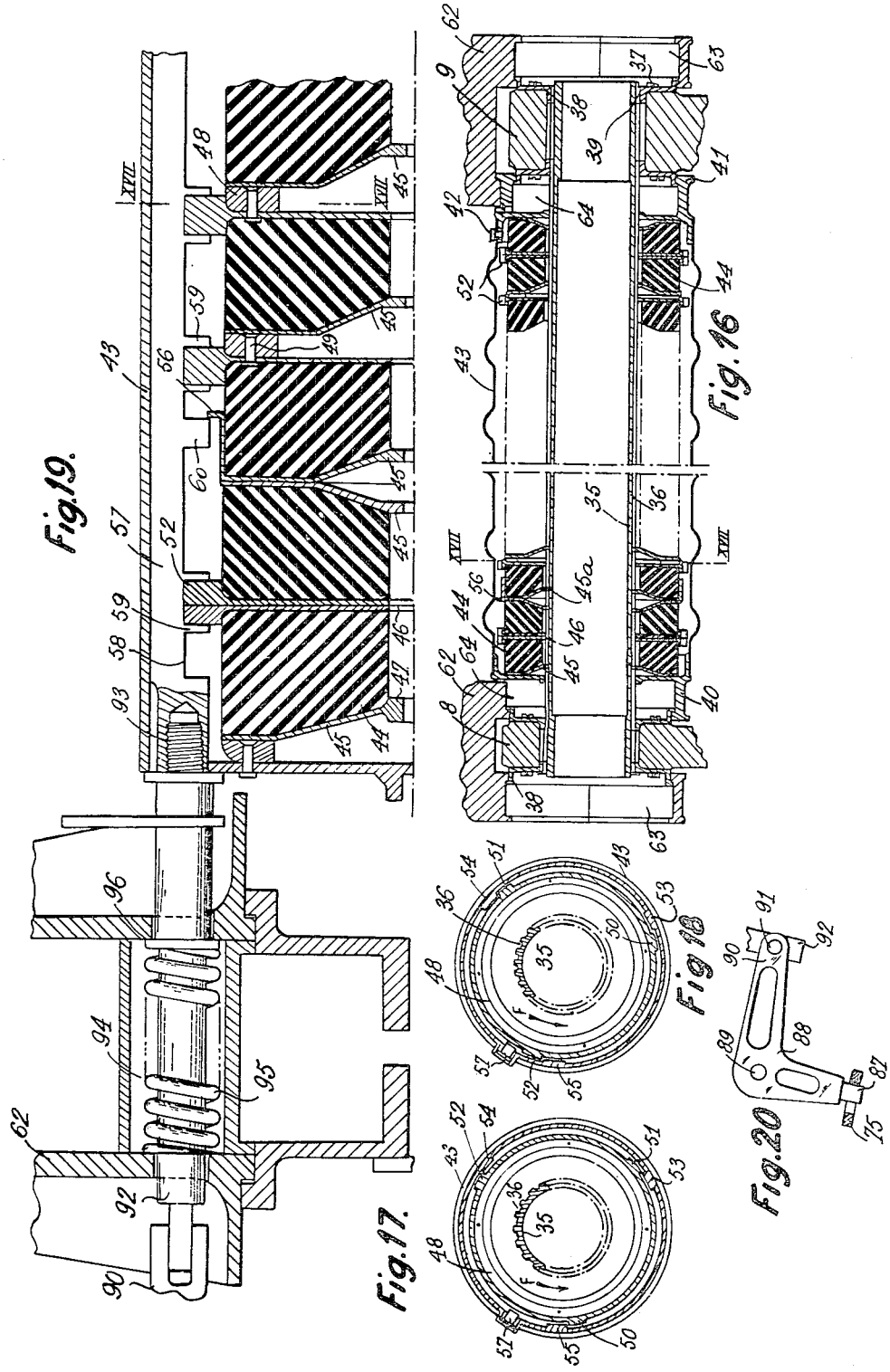

United States Patent Office 2,741,446
Patented Apr. 10, 1956

2,741,446

AIRCRAFT LANDING SKIS

Wsiewolod John Jakimiuk, Paris, France, assignor to Societe Nationale de Constructions Aeronautiques du Sud-Est, Paris, France Application March 9, 1953, Serial No. 341,267

Claims priority, application France March 20, 1952

11 Claims. (Cl. 244—102)

This invention relates to a main landing gear located beneath the center of gravity of the aircraft, of the type adapted to engage the ground through the medium of longitudinal members substantially parallel to the longitudinal plane of symmetry of the aircraft and designed to slide on the ground surface. Landing gear members of this type are usually referred to as landing skis or skids.

The use of landing skis or skids of this type has been known for a long time. Quite naturally skis have been mounted on generally light aircrafts designed to land on ice fields or snow-covered grounds. As a result, in most cases, these skis are mounted on wheel undercarriages and sometimes both wheel and ski actions are combined simultaneously when landing or taking-off.

On the other hand, it has already been suggested to improve the aerodynamic efficiency of aircrafts by suppressing the conventional undercarriages and substituting therefor ski landing gears of which one specific feature is that they reduce the flying-off travel on account of the braking action they exert on the ground. Indeed, conventional retractable undercarriages as now used are of considerable weight, create an additional drag particularly detrimental at the take-off and form with their wheels and frame structure a bulky assembly difficult to retract within the fuselage. Moreover, retractable landing gears involve the use of fairing doors or panels with their associated opening and closing mechanisms, the carriage and doors being further combined with connecting and safety devices to synchronize the operation of both parts of the landing system.

In addition, conventional landing gears require elaborate retracting and braking circuits most likely to be a source of failures, these being particularly dangerous when the aircraft is landing. In fact, the landing gear is used only for landing and taking-off, i. e. during a short time with respect to the flying time. As a consequence, a suggestion has been made to leave on the ground the manoeuvring and take-off gears and to land on skis on any ground.

However, the use of skis as landing means does not dispense with shock damping devices. Hitherto known arrangements in this field comprise hydraulic or pneumatic shock-absorbers of the type utilized in conventional wheel undercarriages, the fulcrum points of these shock-absorbers being determined with a view to permitting the retracting operation. Yet, this solution is still characterized by the noxious intricacy of wheel landing gears.

In order to overcome to the maximum the aforesaid drawbacks of conventional retractable landing gears, it is the main object of this invention to provide a main landing gear consisting of a pair of symmetrical retractable frame structures disposed symmetrically on either side of the longitudinal axis of the aircraft and each provided with a friction beam or skid adapted to serve as landing skis, these frame structures being hingedly mounted about parallel and longitudinal axes and adapted to be moved to and from a retracted position and a landing or lowered position by means of a control mechanism adapted to lock these frame structures in either position, said frame structures having associated therewith resilient means adapted in the landing position to damp out unevennesses and torsional stresses about their hinge axes, said frame structure being also adapted to constitute by themselves, in the retracted position, the external fairing closing the fuselage bottom of the aircraft.

Thus, the aperture created in the fuselage when the landing gear is lowered is closed by the skid-carrying frame structures themselves. According to the class of use of the aircraft, the retractable landing gear may be used when flying as bottom fairing hatches for allowing staff, miscellaneous materials or bombs therethrough according to circumstances.

The shock-absorbing resilient means consist, preferably, of elastic material such as natural or synthetic rubber, but elastic devices such as springs may also be used. This solution simplifies both the fitting and design of the retracting device. The combination according to the invention affords a substantial gain in weight and a great simplification in the manufacture of the landing gear and of the various controls associated thereto.

According to a convenient form of embodiment of this invention, each frame structure consists of a pair of beams positioned one above the other in the landing position, the lower beam constituting the skid and comprising a reinforced portion adapted to frictionally engage the ground, whilst the upper beam acts as a connecting member between the fuselage and the skid. Preferably, in the landing position the skid is hingedly mounted on the upper beam through a substantially horizontal fulcrum pin at right angles to the plane of symmetry of the aircraft, this pin connecting the middle of the skid to the middle of the upper beam and being adapted to transmit the components of the stresses produced in longitudinal planes, a pair of hinged struts, one at the front and the other at the rear, being provided to transmit the transverse stresses applied to the landing gear, the "unevenness" shock-absorbers being arranged between the center joint and the pair of outer joints of the hinged struts. These shock-absorbers are advantageously made of compression-stressed rubber pads providing a damping action in both directions. The upper beam is linked to the fuselage through a torsion-stressed rubber disc shock-absorber.

Another object of the invention is to provide a main landing gear of the character described wherein each frame structure has associated therewith a locking device controllable either to permit a pivotal motion about the fulcrum axis for passing from the landing position to the retracted position, or to link the fuselage with one portion of the shock-absorber elements of the upper beam to make them operative in the aforesaid landing position by permitting a slight outward swinging movement of the frame structures, the skids being specially shaped to accommodate this damped motion. Preferably, hydraulic rams, one for each frame structure, are provided for moving the landing gear to and from its operative position, the extension of a ram unhooking the corresponding frame from the aircraft, then moving said frame in the operative position when landing, the automatic locking of the torsional shock-absorber occurring when the frame attains said operative position. During the retraction of the frame, the ram performs the following operations: unlocking of the torsional shock-absorber, then raising of the frame to its retracted position, and, at the end of its stroke, said ram ensures the automatic hooking of the frame on the aircraft in said retracted position. The retraction and lowering of the landing gear do not interfere with the torsional damping action applied thereto.

The landing gear according to this invention constitutes the main landing gear of the aircraft, the secondary landing gear, as well as the tail wheel, the conventional tail-skid or ski being dispensed with if desired.

The accompanying drawings forming part of this specification illustrate diagrammatically by way of example the manner in which the invention may be carried out in the practice. In the drawings:

Figure 1 is a diagrammatical front elevational view showing an aircraft equipped with a landing gear made in accordance with the teachings of this invention and retracted in aircraft fuselage.

Figure 2 is a view similar to Figure 1 showing the landing gear in its landing position.

Figures 3 and 4 are fragmentary perspective views showing the fuselage portion in which the landing gear according to this invention is mounted, in retracted position and in landing position, respectively.

Figure 5 is a longitudinal section of one of the landing gear frame structures according to the invention.

Figures 6, 7 and 8 are sectional views showing at a greater scale details of the arrangement illustrated in Figure 5, taken upon the lines VI—VI, VII—VII and VIII—VIII of this figure, respectively.

Figure 9 is a front sectional view showing the bottom portion of a fuselage equipped with the two symmetrical landing gear frame structures in their retracted position, the section being taken upon the line IX—IX of Figure 5.

Figures 10 and 11 are views similar to Figure 9 showing the right-hand frame structure thereof in its lowered position, before landing and resting on the ground, respectively.

Figure 16 is a longitudinal section showing at a greater scale details of the torsion-stressed shock-absorber.

Figure 17 is a cross-section taken upon the line XVII—XVII of Figure 16, showing the shock-absorber being in its retracted condition.

Figure 18 is a view similar to Figure 17 with the shock-absorber in its landing condition.

Figure 19 is a fragmentary sectional view at a still greater scale showing details of one portion of the torsion shock-absorber together with the arrangement for controlling the corresponding locking device, and Figure 20 is a fragmentary view showing the bell-crank lever controlling the shock-absorber locking device and its operative lever.

Figure 12:
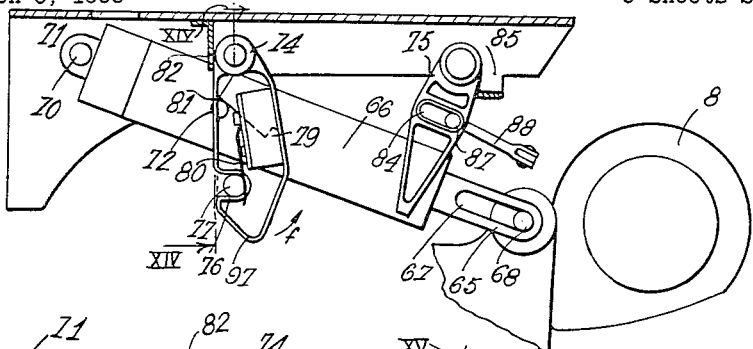
Figure 12 shows an enlarged view of Figure 9 of the control ram and the levers associated thereto in the retracted position.

Referring now to the drawings and more particularly to Figs. 1, 2, 3, 4, the bottom portion of the fuselage of an aircraft 1 has formed therein, in the zone of the center of gravity, a compartment 2 adapted to receive in their retracted position a pair of symmetrical frame structures 3, 3a constituting the landing gear of the aircraft. The external contours of these frame structures are so shaped as to form by themselves, in their retracted position, the external fairing for their common compartment. On the other hand, these frame structures have associated therewith a control device consisting of a ram adapted to lower the landing gear until it is spread to the positions shown in Figs. 2 and 4.

Each frame structure 3 or 3a is composed (as shown in Figs. 5 to 8) of a pair of beams 4, 5 positioned one above the other in the landing position. The lower beam 5 comprises a lightened body, preferably made of light alloy such as magnesium and shaped to have a cross-sectional profile curved inwards, a reinforcing hard metal member 6, for example a steel sheet, being secured to this profile to permit the frictional engagement between this lower beam, acting as a skid or ski, and the ground.

The upper beam 4 is also adequately lightened and made of light alloy; it comprises a yoke element 7 for fastening the ram and a pair of strap-forming lugs 8, 9 having mounted therebetween the torsion-stressed damping device as will be made clear presently. The axes of yoke 7 and straps 8, 9 are substantially aligned with the inner face of beam 4, the outer face of this beam having a convex profile corresponding in shape to the contour 10 of the fuselage when the landing gear is retracted.

The upper beam 4 and lower beam or skid 5 are interconnected through a hinge pin 11 extending at right angles to the plane of symmetry of the aircraft, and substantially horizontally in the landing position. This hinge pin (see Fig. 7) is fitted in a strap 12 formed on the top medial portion of the lower beam 5 and in an element 13 depending from the upper beam 4, with the interposition of adequate bearings 14, 15. This hinge pin is adapted to transmit the components of the stresses produced in longitudinal planes.

On the other hand, as shown in Fig. 5, adjacent the front and rear ends of the upper beam 4, strap-shaped recesses are provided for receiving the upper links 16, 16a of a hinged connection the lower links 17, 17a of which are attached in strap-shaped recesses provided in the lower beam 5. These hinged connections (see Fig. 8) are made through the intermediary of hinge pins such as 18, 19, 20 fitted in suitable bearings and adapted to transmit the transverse stresses applied to the skid.

Finally, between the upper beam and the lower beam, on the one hand, and between the main hinge pin 11 and each hinged connection, on the other hand, shock-absorbers adapted to damp out differences in level in the ground (hereafter termed "unevenness shock-absorbers") are provided. These shock-absorbers consist of stackings of alternative rubber discs or pads 21 and light-alloy washers 22. The longitudinal shape of these pads 21 is that of truncated wedges having their vertices directed toward the central hinge pin 11. Each shock-absorber is pre-stressed by means of a plate member 23 and U-shaped member 24 clamped by a screw 25 of which the head engages the plate 23 whilst the threaded shank of the screw engages a correspondingly threaded bore 26 formed in the lower beam 5. On either side of the upper beam 4 and registering with each unevenness shock-absorber are secured metal plates 27, 28 formed with in-turned edges 29, 30. When the beams are unstressed, these edges engage the external edges 31, 32 formed on the wings of the U-shaped member 24.

These shock-absorbers operate as follows:

When a stress tends to move the beams 4, 5 toward each other on one side of the central hinge pin 11, the rubber pads 21 of the unevenness shock-absorber positioned on the side where the stress is applied are compressed, the side plates 27, 28 sliding along the wings of the U-shaped member 24, whilst the head of the screw 25 moves in sliding engagement with the bore 33 provided in the upper beam 4. Meanwhile, in the other shock-absorber which is positioned in the zone where the beams 4, 5 tend to move away from each other, the in-turned edges 29, 31, on the one hand, and the outer edges 30, 32, on the other hand, connect the U-shaped member 24 with the upper beam 4. Then, the U-shaped member 24 is separated from the lower beam 5 and simultaneously the upper plate 23 leaves the upper beam 4 on account of the downward thrust exerted by the head of the screw 25. As a result, the rubber pads 21 are compressed. Consequently, the unevenness shock-absorbers will be operative in both directions of stress, since they are always compressed when compressive or tractive efforts are applied between the two beams.

On its outer face, the lower beam 5 is provided with a flange-forming portion 34 covering the connection between the U-shaped member 24 and the upper plate 28 whilst ensuring the continuity of the outer fairing.

The upper beam 4 is hingedly connected about an axis parallel to the plane of symmetry of the aircraft. This beam is attached to the fuselage through the medium of a torsion-stressed rubber disc shock-absorber.

As illustrated in Figs. 5, 16 and 19, this shock-absorber comprises a central shaft 35 formed with longitudinal splines 36. The lugs 8 and 9 carry, on the other hand, on their both sides, hollow cup members 38 formed with outer shoulders through which they bear on the shells 40 and 41 fast with the fuselage or hull structure by construction on assembling the aircraft. These shells are secured through screws 42 on the outer casing 43 of the shock-absorber. The inner edges of the hollow cup members 38 carry inner dogs 39 adapted to engage the splines 36 of shaft 35; in addition, these cup members are connected through suitable bolts 37 to the strap lugs 8, 9.

Between the casing 43 and the shaft 35, there are mounted in succession a set of rubber annuli 44 fast with slightly dished metal washers 45 and flat metal flanges 46. The washers 45 project inward of the relevant rubber annulus by means of a series of teeth 47 engaging the aforesaid splines 36 of shaft 35. Each flange 46, except for the first and last washers, carries a ring 48 of friction material, for example of the kind known under the trade name of "Ferodo," this friction ring being secured to the corresponding flange 46 through rivets 49 and engaging the flat metal flanges 46 of the adjacent washers.

On the other hand, each flat flange 46 is provided with a set of three outer dogs 50, 51, 52 (see Fig. 17) adapted to engage check members 53, 54, 55 carried by the casing 43 as will be made clear presently. In addition, one of the toothed washers 45a is formed on its peripheral surface with a helical cam 56 for a purpose to be defined presently. In the casing 43 is also mounted a control rod 57 formed with notches 58 separating teeth 59 positioned in the zone of the outer dogs 52 of the flat flanges 46. This control rod carries a stud 60 engaging the helical cam groove 56.

The shock-absorber assembly mounted on the upper beam 4 is secured to the fuselage or hull flooring 61 through the medium of members 62 fast with this fuselage or hull and forming a cap member 63 at the front and at the rear of the lugs 8, 9 of the upper beam in order to support same through engagement with the hollow cup members 38 so as to form bearing sections 64 between these lugs 8, 9 and the shock-absorber on which the shells 40, 41 are secured. Thus, the upper beam assembly is hingedly mounted about the axis of the shock-absorber fixation on the hull or fuselage.

On the front yoke 7 of the upper beam there is secured the head 65 of a control ram 66 (see Figs. 9 to 11). This head 65 is formed with a slot 67 engaged by a pin 68 fastened to the yoke 7. On the other hand, the rod 69 of this ram is hingedly connected at 70 to a supporting member 71 fastened in turn to the floor and within the compartment 2. In addition, this ram is provided, on either side of a plane at right angles to the plane of symmetry of the aircraft, with a pair of projecting studs 72 for a purpose to be defined presently.

Besides, on the same supporting member 71 are secured the pairs of twin levers 74, 75. The first twin lever 74 has formed in its arms, toward the aircraft axis, a notch 76 adapted to receive a pin 77 carried by a strap 78 projecting from the inner face of the lower beam 5. On the front face of the lever 74 is also mounted a midget switch 79 provided with blade contacts 80. On the other hand, the inner faces of both arms of twin lever 74 (see Fig. 14) are provided with a cam groove 81 engaged by the studs 72 carried by the ram casing. Moreover, this lever is urged for engagement with a stop 82 carried by the supporting member 71 by a pair of tension springs 83.

Figures 14, 15:
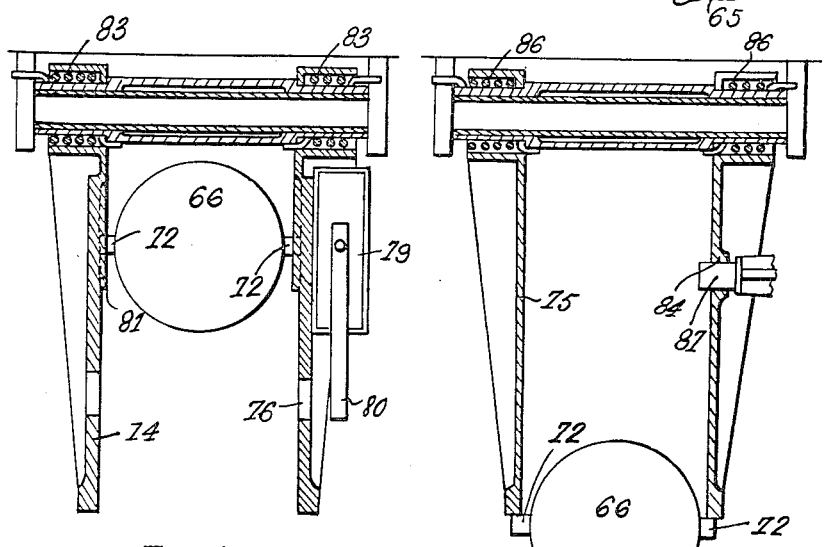
Figures 14 and 15 are cross-sectional views showing at a greater scale the two levers associated to the hydraulic ram and respectively taken along line XIV—XIV of Fig. 12 and line XV—XV of Fig. 13.

The other twin lever 75 has formed in its front arm a slot 84 and is urged for engagement with a stop member 85 provided on the supporting member 71 by a pair of tension springs 86 (Fig. 15). This slot 84 receives the end portion 87 of a bell-crank lever 88 fulcrumed at 89 on a fixed member (not shown) rigid with the supporting member 71. The opposite end of lever 88 (see Fig. 20) terminates with a strap 90 pivotally connected through a pin 91 to the end of a rod 92 secured through a screw threading 93 to the notched control rod 57 (Fig. 19). This rod 92 extends through a cavity 94 formed in the member 62 in which it is surrounded by a compression spring 95 bearing with one end against the said member 62 and with its opposite end against a shoulder 96 formed on the rod 92.

The above-described arrangement operates as follows:

Assuming the frame structure in its retracted position as illustrated in Fig. 9 with the elements of the control device in the position shown in Fig. 12. Then the pin 77 engages the notch 76 of lever 74 thereby positively "hooking" the frame structure in its retracted position. At the same time, both studs 72 engage the cam grooves 81 of levers 74 and the latters are themselves in engagement with the stop 82, whilst the levers 75 engage their relevant stop member 85 and the end portion 87 of the bell-crank lever 88 abuts the external side of slot 84, and pin 68 bears on the external side of its slot 67.

When the pilot acts as usual to operate the ram, both studs 72 move in straight line so as to push the cam grooves 81 as long as the pin 68 cannot move, as it is an integral part of the still locked frame structure. Thus, these pins 72 cause the lever 74 to rotate in the direction of the arrow f (Figs. 12, 13) until the pin 77 is released from the notch 76. Then, the slot 76 has been moved to the extent that the pin 68 engages its inner side whilst the studs escape from the cam grooves 81. The ram is therefore allowed to swing the frame structure about the axis of the shock-absorber which is the axis through which the frame structure is fulcrumed on the fuselage. Then, as the pin 77 is released from the lower cam face 97 of lever 74, the latter is brought back by the springs 83 for engagement with its stop 82. As a result, the frame structure will be lowered by its own weight and with the assistance of the ram to occupy the position shown in Fig. 10. Obviously, both studs 72 will describe a curve 102 during this movement.

Meanwhile, the angular movement of shaft 35 about its axis, resulting from the corresponding movement of the upper beam 4, causes the helical cam groove 56 to move the notched control rod 57 forwards (Fig. 19) by acting upon the stud 60, while compressing the spring 95; at the same time, the lever 88 moves freely within the slot 84 of lever 75. Thus, the rubber annuli rotate and drive the dogs 50, 51, 52 in the direction of the arrow F (Fig. 17). This angular movement is continued until the dogs 52 are positioned behind the teeth 59 of the control rod 57 abutting the stops 55 and until the dogs 50, 51 engage the stops 53, 54. At this moment, the stud 60 is released from the helical cam groove 56 and the control rod is returned by the compression spring 95 to the position shown in Fig. 18. The shaft 35 is then free to rotate in the shock-absorber due to torsional movements of the rubber annuli the outer edges of which are held against motion by the presence of the dogs 52 between the notches of the control rod 57 and the stops 55. A slight clearance is provided between these three last mentioned members. Then, the control members are positioned as shown in Fig. 13.

Figure 13:
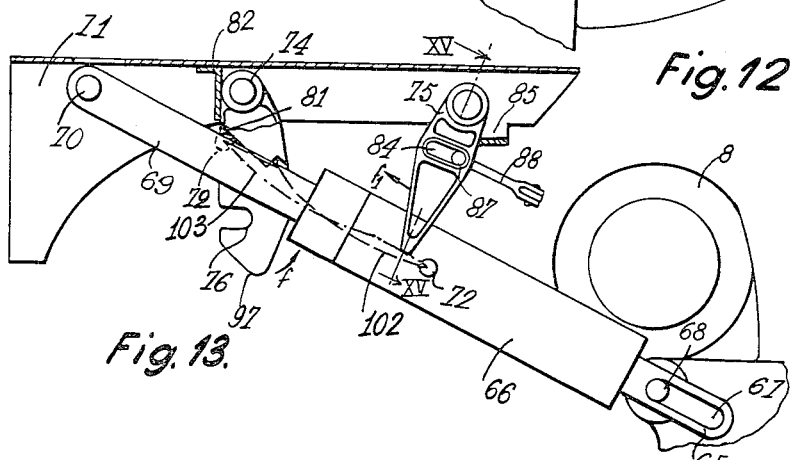
Figure 13 is a view similar to Figure 12 showing the ram unit in its extended condition.

When the aircraft is landing, the frame structures of the undercarriage may oscillate between the position shown in Figs. 10 and 13 and the outermost position shown in Fig. 11, these swinging movements being afforded by the displacement of pin 68 to the right of slot 67 and damped through the frictional engagement and deflection of the damping elements of the assembly. Obviously, the rubber annuli 44 are torsion-stressed between the dished plates 45 fastened through their teeth 47 to the shaft 35 due to the engagement of these teeth in the splines 36 thereof, and also on account of the flat flanges 46 held by the teeth 59 of the control rod 57.

When a shock occurs, the dogs 50, 51, 52 engage the stops 53, 54, 55 (Fig. 18) whilst the rebound is withheld by the engagement of dogs 52 against the teeth 59 of rod 57. The inward movement of the skid is caused by the loads acting thereon which tend to rock the upper beam 4, this pivotal movement being damped by the deflection of the rubber annuli 44. This displacement is restricted by the check elements (not shown) of lugs 8, 9 which are caused to engage the supporting members 62. In this outermost position, the pin 68 does not act on the ram 66. This damped movement on the ground is catered for by the curved transverse profile of the skid 6.

When it is desired to retract the landing gear, for example after a take-off, the frame structure has assumed the position in which it is shown in Fig. 10, due to the torsional reactions of the rubber annuli of the shock-absorber; under these conditions, the ram is contracted. As a result, the pins 72 move along a straight path as long as the pin 68 engaging the inner side of slot 62 (Fig. 13) has not attained the outer side of this slot. These pins carry along the twin lever 75 in the direction of the arrows $f_1$. This lever 75, through the medium of the slot 84, acts upon the bell-crank lever 88 which pulls the notched rod 57 against the resistance of spring 95. When the teeth 59 of this rod release the dogs 52 (Fig. 18), the rubber annuli restore the shock-absorber assembly to the condition illustrated in Fig. 17. When the lever 75 escapes from the studs 72, it is brought back into engagement with its stop 85 both by the action of springs 86 and by that of spring 95, the latter also acting to restore the notched rod 57 to its original position.

As the ram continues its contraction movement, the pin 77 engages the cam face 97 of lever 74; the latter is moved in the direction of the arrow $f$ until the pin 77 engages again the notch 76. At this time, the springs 83 will move the lever 74 in a direction opposite to that of the arrow $f$ and the frame structure is again locked in its initial position shown in Fig. 9 with the control members in their respective positions indicated in Fig. 12. During this movement, the pins 72 described a curve 103 the end portion of which is substantially parallel to the cam faces 81, until these pins engage the cam faces 81 without, however, having touched them in their backward movement. The complete operating cycle of the apparatus has been described. The proper or faulty operation of the apparatus may be indicated instantaneously to the pilot by means of a visual or sound electrical indicator inserted in the electrical circuit closed by the contact blades 80 of the midget switch 79 when these contact blades engage the pin 77.

The path described by the pins 72 is shown in dotted lines in Fig. 13 for the movement from retracted to lowered position, and in chain-dotted lines for opposite movement, i. e. from lowered to retracted position.

In order to provide the continuity of shape of the fuselage fairing when the landing gear is retracted, the fuselage skinning on either side of compartment 2 may comprise a joining and overlapping sheet metal element 98 formed with notches 99, 100 and 101 (Figs. 3 and 4) to accommodate the movements of straps 7 and 8, 9.

It will be readily understood by anybody conversant with the art that many modifications may be brought to the apparatus shown and described hereinabove by way of example without, however, departing from the spirit and scope of the invention.

What I claim is:

1. A main landing skis assembly for aircraft comprising, in combination, a pair of symmetrical retractable frame structures disposed symmetrically relative to the longitudinal axis of the aircraft, two longitudinal friction members respectively secured under said frame structures whereby they may act as landing skis, two parallel and longitudinal shafts carried by the fuselage and on which are respectively pivotally mounted said frame structures, means for extending and retracting said frame structures, means for hooking said frame structures on the fuselage in retracted positions, means for unhooking said frame structures at the beginning of the extending operation, means for allowing a supplementary extending movement for said frame structures from the normal extended position at landing, means for damping the supplementary extending movement of said frame structures, means for putting said damping means in operative position, and means for damping the displacements of said frame structures, when extended, about an axis transverse to the aircraft longitudinal axis under the action of ground unevennesses.

2. A main landing skis assembly for aircraft, according to claim 1, further comprising, for each frame structure, a hooking shaft secured on the frame structure and wherein, for each frame structure, the extending, retracting, hooking and unhooking means comprise a ram having a rod pivotally mounted on the fuselage and a body formed with a longitudinal slot which is pivotally mounted on the frame structure, the pivotal point of the frame structure through said slot being located near the outer end of said slot when the frame structure is retracted, a lever pivotally mounted on the fuselage and formed with a notch which engages the hooking shaft when the frame structure is retracted, resilient means for urging said lever in hooking position, means for pivoting said lever with a view to obtain the disengagement of said hooking shaft from said notch, means for controlling said pivoting means by the displacement of the ram body, and means for pivoting said lever in the unhooking direction under the action of the hooking shaft when the ram retracts the frame structure until said hooking shaft engages the hooking notch, the pivotal point of the frame structure through the slot coming near the inner end of said slot when the frame structure is extended.

3. A main landing skis assembly for aircraft, according to claim 2, wherein the ram body is formed with two projecting studs parallel to the longitudinal axis of the aircraft, and wherein the lever is a twin-lever bridging the ram body, the arms of said twin-lever being formed with hooking notches and with cam grooves engaging the projecting studs of the ram body for pivoting said twin-lever with a view to disengage the hooking shaft from said hooking notches, said arms being further formed with cam faces on which, during the retraction of the frame structure, the hooking shaft bears for pivoting the twin-lever in the unhooking direction until said hooking shaft faces the hooking notches.

4. A main landing skis assembly for aircraft, according to claim 2, further comprising an electrical switch secured on the lever and having a blade, said blade contacting the hooking shaft when the frame structure is retracted for putting under tension an indicator electrical circuit.

5. A main landing skis assembly for aircraft, according to claim 1, wherein for each frame structure, the means for allowing a supplementary extending movement, for damping the supplementary extending movement and for putting said damping means in operative position comprise a ram having a rod pivotally mounted on the fuselage and a body formed with a longitudinal slot which is pivotally mounted on the frame structure, the pivotal point of the frame structure on said slot being located near the outer end of said slot when the frame structure is retracted and near the inner end of said slot when the frame structure is normally extended, a shock-absorber of the torsion-stressed disc type coaxial with the pivotal axis of the frame structure and comprising an outer casing fixed on the fuselage, an inner shaft defining an annular space with said casing and secured on the frame structure, torsional discs housed in said space around said shaft, metal flanges fast with said shaft and said discs and formed with outer dogs adapted to engage inner check members formed within the casing when the frame structure is normally extended, and a device for maintaining said outer dogs into contact with said check members, means for locking said maintaining device into contact with said outer dogs near the end of the normal extending movement of said frame structure, and means for unlocking said maintaining device at the beginning of the retracting movement of said frame structure, the under part of the frame structure having a curved internal transverse profile with a view to generate a supplementary extending movement by transversal displacement on the ground, said supplementary extending movement being limited by the stroke of the articulation point of the frame structure on the ram between the inner and the outer ends of the longitudinal slot and by the torsional resistance of the torsional discs.

6. A main landing skis assembly for aircraft, according to claim 5, wherein the means for locking and unlocking the maintaining means comprise one of the metal flanges formed with a peripheral helical cam, a notched control rod movable parallelly to the pivotal axis of the frame structure one tooth of which engages said helical cam while its other teeth engage one series of the outer dogs pertaining to the other flanges when said dogs contact the corresponding check members of the casing, said rod being further formed with a shoulder located outside of the shock-absorber casing, a member secured on the fuselage and through which said rod passes, a spring disposed around said rod between said shoulder and said member for releasing said notched control rod, a lever articulated on the fuselage and formed with a slot, a crank lever articulated on the fuselage one end of which passes through said slot while its other end is connected with said notched control rod, whereby during the extending of the frame structure, the flanges fast with the inner shaft of the shock-absorber are freely displaced in rotation until one series of their outer dogs are located between the teeth of said notched control rod and the corresponding check members of the casing under the action of the helical cam on said notched control rod, with a view to allow subsequently the operation of the torsional shock-absorber while, during the retraction of the frame structure, the lever formed with a slot ensures the unlocking of said outer dogs by longitudinal displacement of said notched control rod under the action on said lever of projecting studs formed on the ram body.

7. A main landing skis assembly for aircraft comprising, in combination, a pair of symmetrical retractable frame structures disposed symmetrically relative to the longitudinal axis of the aircraft, two longitudinal friction members respectively secured under said frame structures whereby they may act as landing skis, two parallel and longitudinal shafts carried by the fuselage and on which are respectively pivotally mounted said frame structures, means for extending and retracting said frame structures, means for hooking said frame structures on the fuselage in retracted position, means for unhooking said frame structures at the beginning of the extending operation, means for allowing a supplementary extending movement for said frame structures from the normal extended position at landing; means for damping the supplementary extending movement of said frame structures, means for putting said damping means in operative position, and means for damping the displacements of said frame structures, when extended, about an axis transverse to the aircraft longitudinal axis under the action of ground unevennesses, said frame structures constituting themselves in their retracted position the external fairing closing the bottom of the aircraft fuselage which bottom is itself cut out for allowing the movement of said frame structure while ensuring the junction between the surface of the fuselage bottom and that of said frame structures when retracted.

8. A main landing skis assembly for aircraft comprising, in combination, a pair of symmetrical retractable frame structures disposed symmetrically relative to the longitudinal axis of the aircraft, two longitudinal friction members respectively secured under said frame structures whereby they may act as landing skis, two parallel and longitudinal shafts carried by the fuselage and on which are respectively pivotally mounted said frame structures, means for extending and retracting said frame structures, means for hooking said frame structures on the fuselage in retracted position, means for unhooking said frame structures at the beginning of the extending operation, means for allowing a supplementary extending movement for said frame structures from the normal extended position at landing, means for damping the supplementary extending movement of said frame structures, means for putting said damping means in operative position, means for damping the displacements of said frame structures, when extended, about an axis transverse to the aircraft longitudinal axis under the action of ground unevennesses, and means for indicating when said frame structures have attained their accurate hooking position.

9. A main landing skis assembly for aircraft comprising, in combination, a pair of symmetrical retractable frame structures disposed symmetrically relative to the longitudinal axis of the aircraft, two longitudinal friction members respectively secured under said frame structures whereby they may act as landing skis, two articulation shafts parallel and longitudinal on which respectively pivot said both frame structures, said shafts being secured under the fuselage flooring and housed in a compartment provided under said flooring, means for extending and retracting said frame structures, means for hooking said frame structures in the fuselage in retracted position, means for unhooking said frame structures at the beginning of the extending operation, means for allowing a supplementary extending movement for said frame structures from the normal extended position at landing, means for damping the supplementary extending movement of said frame structures, means for putting said damping means in operative position, and means for damping the displacements of said frame structures, when extended, about an axis transverse to the aircraft longitudinal axis under the action of ground unevennesses.

10. A main landing skis assembly for aircraft comprising, in combination, a pair of symmetrical retractable frame structures disposed symmetrically relative to the longitudinal axis of the aircraft, two parallel and longitudinal shafts carried by the fuselage and on which are respectively pivotally mounted said frame structures, each of said frame structures comprising in landing position an upper longitudinal beam pivotally mounted on the corresponding longitudinal articulation shaft, a lower longitudinal beam, a central shaft perpendicular to the plane of symmetry of the aircraft and pivotally connecting the central portion of said lower beam with the lower part of the central portion of said upper beam for transmitting the components of the stresses in longitudinal planes, a pair of hinged connections the articulation axes of which are transverse and which respectively connect said lower beam to the ends of said upper beam for transmitting the transverse stresses applied to said lower beam, a reinforcement covering secured under the lower part of the lower beam to permit the frictional engagement between said lower beam and the ground, and two shock-absorbers for damping the displacements of the corresponding structure frame, when extended, about an axis transverse to the aircraft longitudinal axis under the action of ground unevennesses, said shock-absorbers being inserted between said beams and disposed between said central articulation shaft and said hinged connections; means for extending and retracting said frame structures, means for hooking said frame structures on the fuselage in retracted position, means for unhooking said frame structures at the beginning of the extending operation, means for allowing a supplementary extending movement for said frame structures from the normal extended position at landing, means for damping the supplementary extending movement of said frame structures, and means for putting said damping means in operative position.

11. A main landing skis assembly for aircraft, according to claim 10, wherein each shock-absorber comprises a stacking of alternate resilient parts and metallic washers, the longitudinal shape of said resilient parts being that of truncated wedges having their vertices directed toward the central articulation shaft, a plate inserted between said stacking and the under part of the upper beam, a U-shaped member housing said stacking, bearing on the lower beam and the wings of which are longitudinally directed and formed with external edges, a screw passing through said plate, said stacking and said U-shaped member while screwing in the lower beam for maintaining said stacking in a pre-compressed state, the head of said screw being slidably counted in a bore formed in the upper beam, and two metal plates respectively mounted on each side of said upper beam nad formed with in-turned edges which engage the lower face of said external edges.

References Cited in the file of this patent

UNITED STATES PATENTS

| | | |
|---|---|---|
| 1,912,498 | Rayburn | June 6, 1933 |
| 2,085,295 | Campbell | June 29, 1937 |
| 2,275,153 | Jeowinka | Mar. 3, 1942 |
| 2,463,351 | Bowers | Mar. 1, 1949 |
| 2,581,935 | Brown | Jan. 8, 1952 |
| 2,582,426 | Greene | Jan. 15, 1952 |
| 2,646,235 | Dawson | July 21, 1953 |
| 2,700,427 | Schomers | Jan. 25, 1955 |

FOREIGN PATENTS

| | | |
|---|---|---|
| 1,009,923 | France | Mar. 12, 1952 |